A. T. McCLUER.
EDUCATIONAL APPLIANCE.
APPLICATION FILED OCT. 30, 1915.
1,243,957.
Patented Oct. 23, 1917.
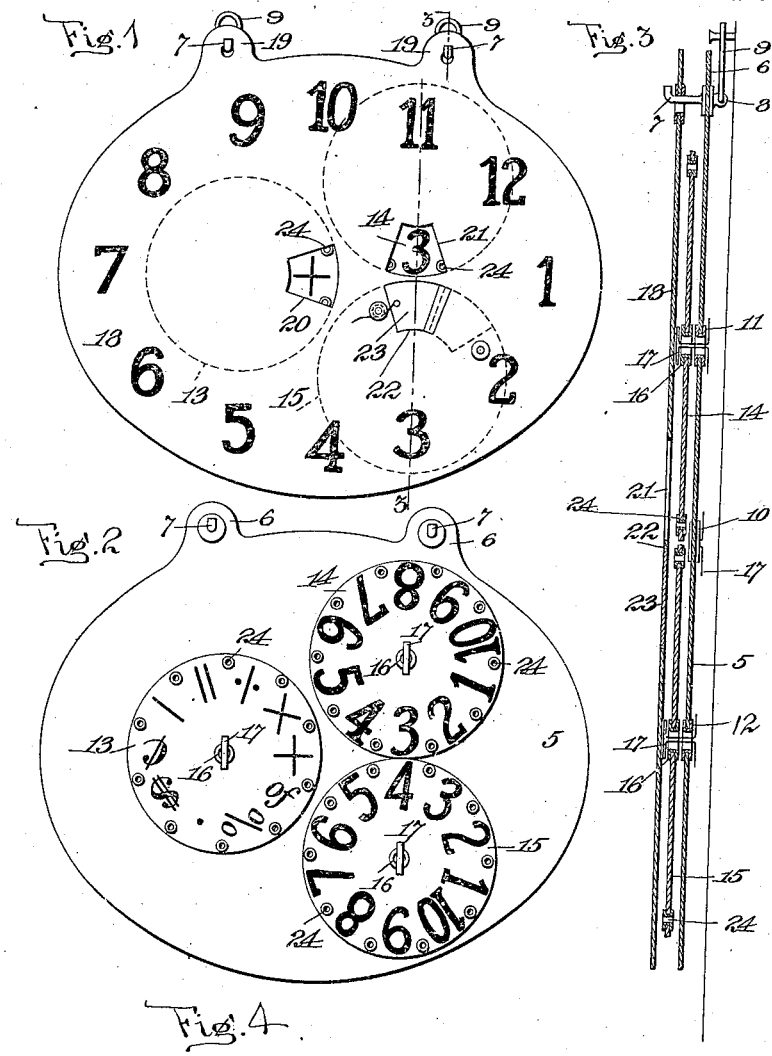

UNITED STATES PATENT OFFICE.

ANNA TAYLOR McCLUER, OF NEW YORK, N. Y., ASSIGNOR OF ONE-HALF TO JOHN ROBERT TAYLOR, OF BROOKLYN, NEW YORK.

EDUCATIONAL APPLIANCE.

1,243,957. Specification of Letters Patent. Patented Oct. 23, 1917.

Application filed October 30, 1915. Serial No. 58,761.

*To all whom it may concern:*

Be it known that I, ANNA TAYLOR Mc-CLUER, a citizen of the United States, residing in the borough of Manhattan, city, county, and State of New York, have invented a certain new and useful Educational Appliance, of which the following is a specification.

My invention relates to appliances to be used in the school room to facilitate the teaching of mathematics in its different branches.

It is the present practice to use charts for this purpose. Such charts are formed of paper or cardboard each containing one subject. One chart will contain the multiplication table, others examples in addition, subtraction, division, fractions, percentage, decimals, proportion, etc. This necessitates many charts which must be made by the teacher, require room for storage, and much time is consumed in hanging the charts on the walls and in removing and storing them.

The objects of my invention are to materially reduce the number of charts required, to save time in handling and reduce storage space.

These and further objects will more fully appear in the following specification and accompanying drawings, considered together or separately.

I have illustrated my invention in the following drawings, in which—

Figure 1 is a front elevation of my improved appliance showing the same arranged for examples in addition.

Fig. 2 is a similar view of the dial board with the chart removed.

Fig. 3 is a section, on an enlarged scale, taken on line 3—3 of Fig. 1.

Fig. 4 is a horizontal section of a carrying and storage case for the device; and Fig. 5 is a front elevation of a modified form of chart.

In the drawings, in which similar reference characters designate corresponding parts in all the figures, 5 designates a backing or dial board which is preferably constructed of heavy cardboard or other relatively thin material of sufficient strength to resist warping. The backing is preferably of elliptical shape and is provided along one of its longer sides with tabs or ears 6, 6. Each of the tabs 6 has secured thereto a fitting from one side of which projects a pin or hook 7 and is provided on the opposite side with an eye 8 in which is secured a ring 9. In use the rings 9 are passed over nails or hooks carried by a wall, partition or the like. The backing is provided at three several points with eyelets 10, 11 and 12.

In connection with the backing or dial board I provide a series of dials or disks 13, 14 and 15. Each dial is provided at its center with an eyelet 16. In the present embodiment of my invention the disk 13 has designated thereon various signs denoting arithmetical operations, such as the signs indicating addition, multiplication, division, the decimal point, $, ¢, %, etc. This dial is secured to the dial plate 5 by means of a paper fastener 17 of the McGill type passing through the eyelet 16 of the disk and the eyelet 10 of the backing.

The disks 14 and 15 is each provided with a series of numbers ranging from 1 to 10 and are secured to the eyelets 11 and 12 respectively in the same manner as that described in connection with the disk 13.

In connection with the dial plate or backing I employ a chart 18. This chart is of the same size and shape as the backing and is provided with perforated ears or tabs 19, 19 corresponding to the ears 6 of the backing. The chart has designated thereon the numerals 1 to 12 inclusive, preferably arranged in elliptical form near the edge of the chart. The chart is provided with an opening 20 through which a portion of the disk 13 may be seen, an opening 21 through which a portion of the disk 14 may be observed and a window 22 by means of which a number on the disk 15 may be viewed. The window 22 is provided with a hinged shutter 23 by means of which it may be closed. The shutter may be secured in open or closed position in any well known manner, that shown being a well known form of envelop fastening.

When in use the chart is hung in front of the backing by passing the perforations of the ears 19 over the hooks 7. This will conceal the disks 13, 14 and 15 and the characters thereon, except those disclosed through the openings 20, 21 and 22.

Each of the disks 13, 14 and 15 is provided with a series of eyelets 24 located near its periphery. The eyelets are located between the characters on the disks and are so arranged that an eyelet will be accessible in the openings 20, 21 and 22 respectively. When it is desired to change the character appearing in any opening a sharp pointed instrument, such as a pencil, may be extended through the opening to engage the perforation in an eyelet and the disk may be rotated step-by-step until the desired character is disclosed without the necessity of removing the chart.

In connection with the chart I provide a carrying and storage case 25. This case is preferably made in the form of an envelop and is provided with partitions forming a compartment 26 for the reception of charts, a compartment 27 for the disk board or backing and pockets 27 and 28 for holding the disks.

Any number of charts 18 may be employed and the numerals carried by them may be of any series. Separate disks 13 may carry algebraic, geometrical or other symbols, and the numbered disks 14, 15 may contain numbers of any series.

With the device shown in the present embodiment of my invention and arranged in the manner shown in Fig. 1 it will be seen that the appliance is to be used to facilitate problems in arithmetic, and as the sign "+" appears in the opening 20 it is understood that the operation is to be addition and that, as the numeral "3" appears in the opening 21, that number is to be added to some other number: Thus when the instructor points to "12" the pupil will know that 3 is to be added to that number. If the problem is to be one in multiplication a pencil or other pointed instrument will be passed through the opening 20 and inserted in the opening in an eyelet in the disk 13 and the disk will be rotated until the sign "×" appears in the opening. The pupil will then know that a number is to be multiplied by 3 and when the instructor points to a number on the chart he will know that that is the number to be so multiplied. Any operation in arithmetic may be thus carried on.

When it is desired to change the number appearing in the opening 21, the disk 14 will be rotated as above.

Should it be desired to use a vulgar fraction as multiplier for example, the shutter 23 is opened and with the disk 15 in the position shown the fraction ¾ will appear, and with the sign "×" in the opening 20 it will be understood that a number is to be multiplied by ¾ and if 8 be pointed out the answer will be 6.

In the modification shown in Fig. 5 the chart instead of having a single series of characters may have a plurality of series and in the embodiment of the invention illustrated the items of one series are arranged over the items in another series. By this arrangement and by using the character shown in the opening 21, a problem in addition may have three or more addends. For subtraction the neighboring numbers on the chart may be added together to form a minuend and the number shown in the opening subtracted from the sum. The same operation may be carried out in multiplication or division.

In accordance with the provisions of the patent statutes, I have described the principle of my invention, together with the apparatus which I now consider to represent the best embodiment thereof; but I desire to have it understood that the apparatus shown is merely illustrative and that the invention may be carried out in other ways.

Having now described my invention, what I claim as new and desire to secure by Letters Patent, is:

1. An educational appliance having a back, a plurality of disks mounted on the back and each carrying a character indicating an item of a problem, a removable chart secured to the back, said chart carrying a character denoting an item of the problem, means whereby each character on the back may be viewed through the chart, means carried by the chart whereby a character on a disk may be covered, a disk carrying a character indicating the operation to be performed, and means for changing the operation character.

2. An educational appliance having a back, a plurality of disks mounted on the back and each carrying a character indicating an item of a problem, a removable chart secured to the back, said chart carrying a character denoting an item of the problem, the chart having an opening whereby each character on the back may be viewed through the chart, means carried by the chart for closing one of the openings, a disk carrying a character indicating the operation to be performed, and means for changing the operation character.

3. An educational appliance having a back, a disk rotatably carried on the back, a series of characters each indicating an item of a problem carried on the disk, a chart removably carried on the back, said chart having a character denoting another item of the problem, said disk having a perforation whereby it may be rotated, there being an opening in the chart for disclosing a single character, and a perforation.

4. An educational appliance having a back, a disk rotatably carried on the back, a series of characters each indicating an item of a problem carried on the disk, a chart removably carried on the back, said chart having a series of characters each denoting another item of the problem, said disk having a perforation whereby it may be rotated, there being an opening in the chart for disclosing a single character on the disk and a perforation.

5. An educational appliance having a back, a disk rotatably carried on the back, a series of characters each indicating an item of a problem carried on the disk, a chart removably carried on the back, said chart having a series of characters each denoting another item of the problem, said disk having an eyeleted perforation whereby it may be rotated, there being an opening in the chart for disclosing a single character and a perforation in the disk.

6. An educational appliance having a back, a disk rotatably carried on the back, a series of characters each indicating an item of a problem carried on the disk, a chart removably carried on the back, said chart having a character denoting another item of the problem, said disk having an eyeleted perforation whereby it may be rotated, there being an opening in the chart for disclosing a single character on the disk and a perforation.

7. An educational appliance having a back, a disk rotatably carried on the back, a series of characters each indicating an item of a problem carried on the disk, a chart removably carried on the back, said chart having a character denoting another item of the problem, said chart having an opening for disclosing a single character on the disk, there being a perforation in the disk accessible through the opening for rotating the disk.

8. An educational appliance having a back, a disk rotatably carried on the back, a series of characters each indicating an item of a problem carried on the disk, a chart removably carried on the back, said chart having a series of characters each denoting another item of the problem, there being an opening in the chart for disclosing a single character on the disk, there being a perforation in the disk accessible through the opening for rotating the disk.

9. An educational appliance having a back, a disk rotatably carried on the back, a series of characters each indicating an item of a problem carried on the disk, a chart removably carried on the back, said chart having a character denoting another item of the problem, there being an opening in the chart for disclosing a single character on the disk, there being an eyeleted perforation in the disk accessible through the opening for rotating the disk.

10. An educational appliance having a back, a disk rotatably carried on the back, a series of characters each indicating an item of a problem carried on the disk, a chart removably carried on the back, said chart having a series of characters each denoting another item of the problem, there being an opening in the chart for disclosing a single character on the disk, there being an eyeleted perforation in the disk accessible through the opening for rotating the disk.

11. An educational appliance having a back, a plurality of disks rotatably mounted on the back, a series of characters on each disk, each character indicating an item of a problem, a plurality of charts each having a different series of characters and adapted to be removably carried on the back, there being openings in each chart each disclosing a character on the disk, means for rotating the disks, means for closing one of the openings, a disk carrying a series of symbols indicating various operations, there being an opening in each chart for disclosing an operation symbol, and means for rotating the operation disk.

12. An educational appliance having a back, a dial containing mathematical symbols rotatably mounted on the back, a dial containing numbers rotatably mounted on the back, a second dial carrying numbers rotatably mounted on the back, means for supporting the back, hooks carried by the back, a plurality of charts each having a different series of characters and adapted to be removably supported by the hooks, there being an opening in each chart for disclosing a symbol on the symbol dial, there being an opening in each chart for disclosing a number on the first number dial, there being an opening in each chart for disclosing the second number dial, a flap on each chart for closing the latter opening, and eyelets in the dials between the characters carried thereon for rotating the dials.

13. An educational appliance having a back, a dial containing mathematical symbols rotatably mounted on the back, a dial containing numbers rotatably mounted on the back, a second dial carrying numbers rotatably mounted on the back, means for supporting the back, hooks carried by the back, a plurality of charts each having a different series of characters and adapted to be removably supported by the hooks, there being an opening in each chart for disclosing a symbol on the symbol dial, there being an opening in each chart for disclosing a number on the first number dial, there being an opening in each chart for disclosing the second number dial, a flap on each chart for closing the latter opening, eyelets in the dials between the characters carried thereon for rotating the dials, and a casing having separate compartments for receiving the backing, a plurality of charts and a plurality of dials.

14. An educational appliance having a back, a disk mounted on the back, said disk having a character indicating an item of a problem, a chart carried by the back, said chart carrying a character denoting an item of a problem, means whereby a character on the disk may be viewed through the chart, means whereby the character on the disk may be hidden, a disk carrying a character indicating the operation to be performed, and means for changing the operation character.

15. An educational appliance having a back, a disk mounted on the back, said disk having a character indicating an item of a problem, a chart carried by the back, said disk being covered by the chart, said chart carrying a character denoting an item of a problem, means whereby a character on the disk may be viewed through the chart, means whereby the character on the disk may be hidden, means accessible from outside the chart for rotating the disk, a disk carrying a character indicating the operation to be performed, and means for changing the operation character.

This specification signed and witnessed this 27 day of Oct., 1915.

ANNA TAYLOR McCLUER.

Witnesses:
EMMA J. GRIBBIN,
MAUDE MALEY.

Copies of this patent may be obtained for five cents each, by addressing the "Commissioner of Patents, Washington, D. C."